United States Patent

Hanson

[15] 3,698,767
[45] Oct. 17, 1972

[54] HAYSTACK FORMING DEVICE

[72] Inventor: Howard G. Hanson, Wolverton, Minn. 56594

[22] Filed: May 19, 1971

[21] Appl. No.: 144,890

Related U.S. Application Data

[63] Continuation-in-part of Ser. No. 881,697, Dec. 3, 1969, Pat. No. 3,596,784.

[52] U.S. Cl. ..................298/27, 298/5, 214/83.18
[51] Int. Cl. ................................................B60p 1/56
[58] Field of Search........214/506, 83.18, 83.2, 83.24, 214/512; 280/43.11, 43.23; 298/27, 28, 5

[56] References Cited

UNITED STATES PATENTS

| | | | |
|---|---|---|---|
| 2,313,078 | 3/1943 | Tourneau | 298/27 |
| 3,183,852 | 5/1965 | Fritz | 298/27 X |

*Primary Examiner*—Albert J. Makay
*Attorney*—Williamson, Palmatier & Bains

[57] ABSTRACT

A mobile haystack forming device includes a housing supported by ground engaging wheels which are vertically shiftable between a lowered extended travel position and a raised retracted position wherein the housing is positioned from the surface of the ground. The housing has a floor structure which is forwardly movable to open the lower end of the housing and allow the haystack to be positioned upon the ground. The housing also has rear doors which are power shifted to an open position to permit the housing to be pulled forwardly away from the haystack. A hitch mechanism connects the device to the towing vehicle and is releasably locked to the floor structure when the haystack forming device is being towed, but is longitudinally shiftable relative to the floor structure in a forward direction to produce a jarring effect on the housing prior to moving the floor structure to an open condition. This facilitates release and removal of the haystack from the housing.

6 Claims, 9 Drawing Figures

PATENTED OCT 17 1972 3,698,767

INVENTOR.
HOWARD G. HANSON

BY Williamson Palmatier
& Bains ATTORNEYS

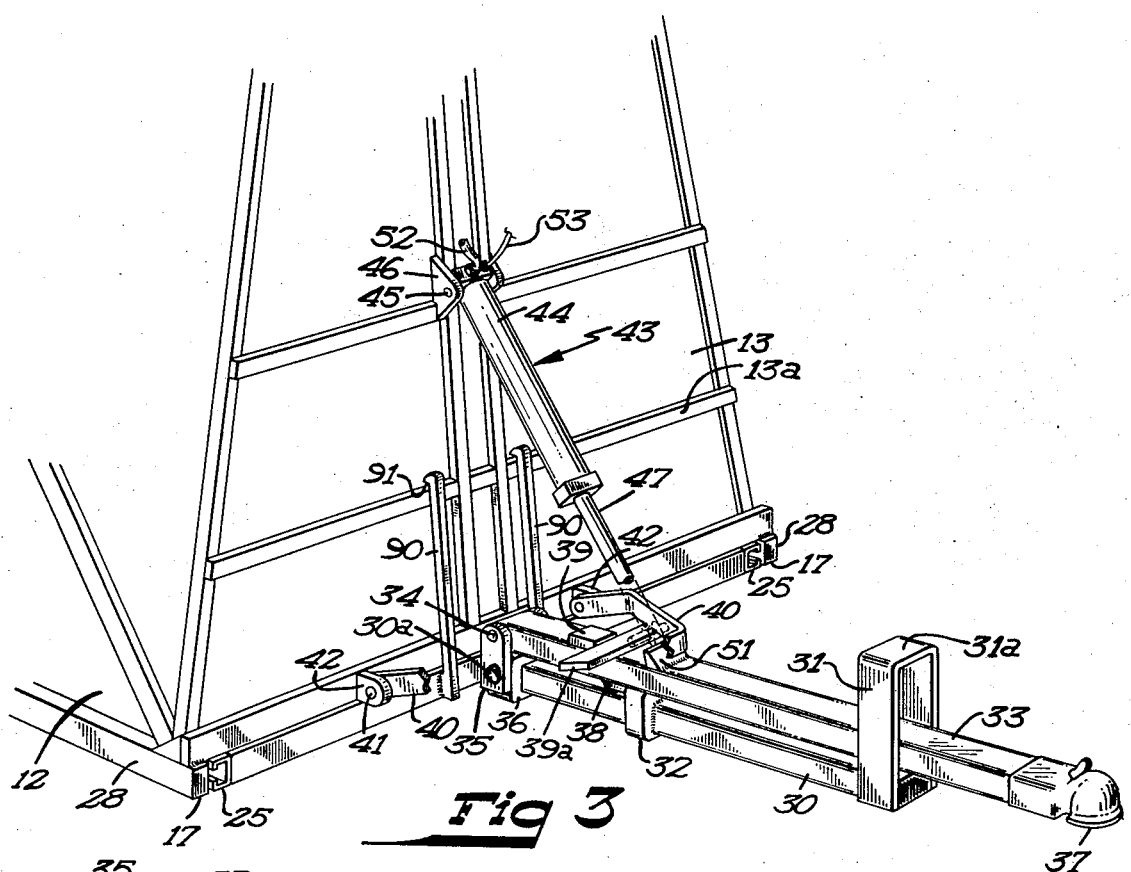
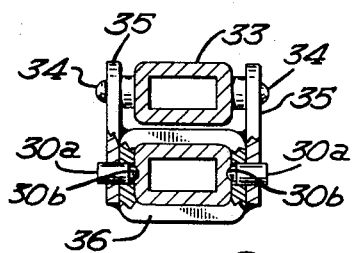
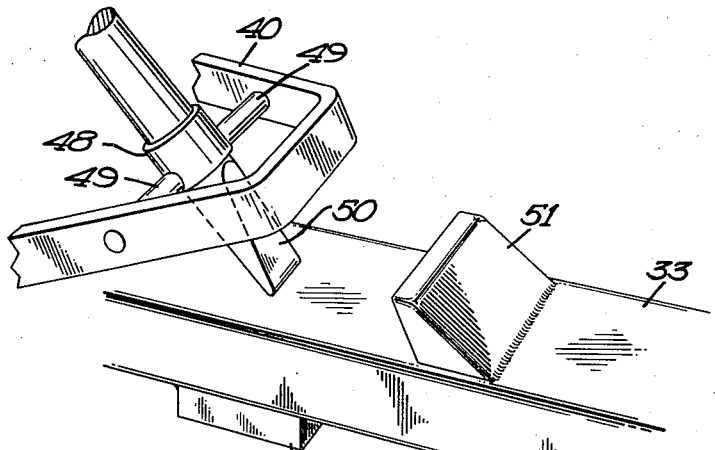
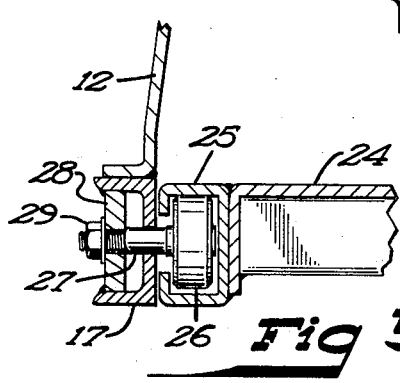
INVENTOR.
HOWARD G. HANSON
BY Williamson Palmatier
& Bains ATTORNEYS

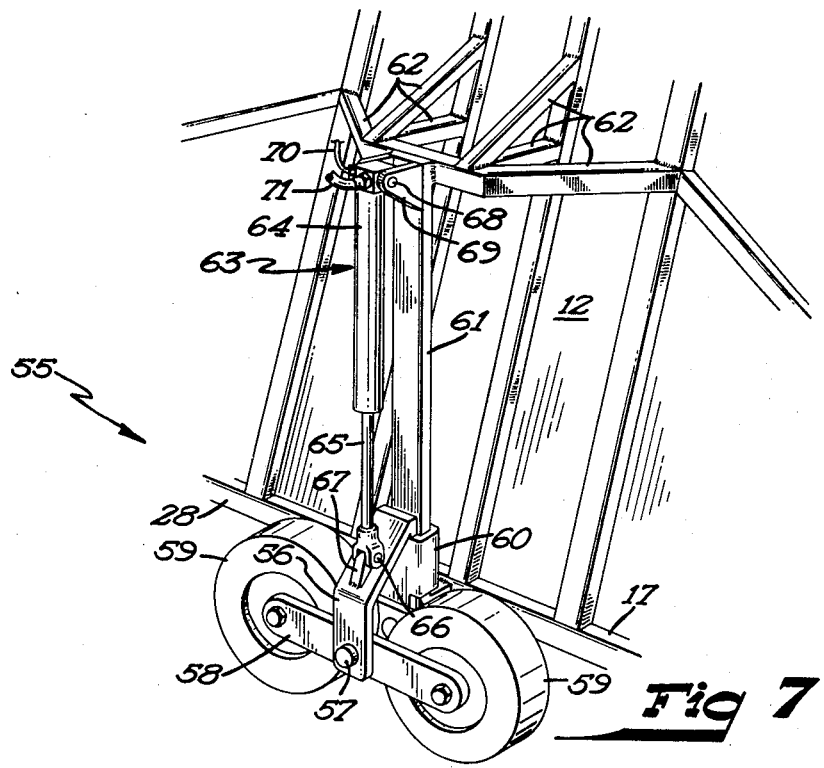
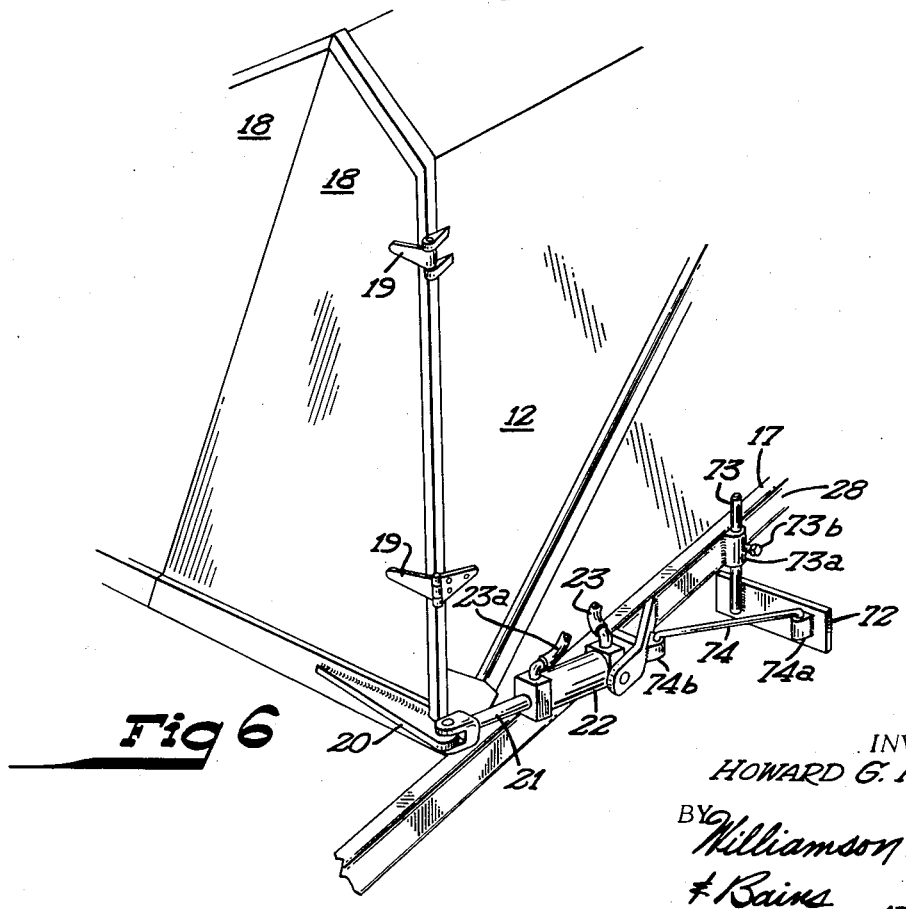

HAYSTACK FORMING DEVICE

This is a continuation-in-part application of co-pending application Ser. No. 881,697, filed Dec. 3, 1969, now U.S. Pat. No. 3,596,784 and entitled "Haystack Forming Device."

SUMMARY OF THE INVENTION

It is a general object of this invention to provide a novel and improved haystack forming device in which chopped hay is collected and formed into a dimensionally stable symmetrical stack as the hay is being chopped, and the shaped stack is then deposited upon the surface of the ground. The present haystack forming device, has wheel assemblies which support the housing for travel over the ground, but which are retracted to position the housing directly upon the ground, thus allowing the haystack to be deposited on the ground. The hitch is releasably locked to the floor structure and is held in this condition by a novel locking arrangement. The hitch is locked to the housing and the floor structure when the device is being towed, but when released, it is longitudinally shiftable in a forward direction relative to the floor structure and produces a jarring effect on the housing prior to moving the floor structure to the open condition. This facilitates removal of the stack from the housing. The hitch is readily releasable by means of a hydraulic ram which is operable from the tractor.

These and other objects and advantages of this invention will more fully appear from the following description made in connection with the accompanying drawings wherein like reference characters refer to the same or similar parts throughout the several views.

BRIEF DESCRIPTION OF THE FIGURES OF THE DRAWING

FIG. 3 is a perspective view illustrating the front end portion of the haystack forming device and specifically illustrating the hitch mechanism and locking arrangement associated therewith;

FIG. 4 is an enlarged perspective view illustrating certain details of the construction of the hitch mechanism and of the novel locking device;

FIG. 5 is a cross-sectional view taken approximately along line 5—5 of FIG. 2 and looking in the direction of the arrows;

FIG. 6 is a rear perspective view of the housing and illustrating the closure members or doors associated therewith;

FIG. 7 is a perspective view of one of the wheel assemblies illustrating details of construction thereof.

DETAILED DESCRIPTION OF THE INVENTION

Figure 1:
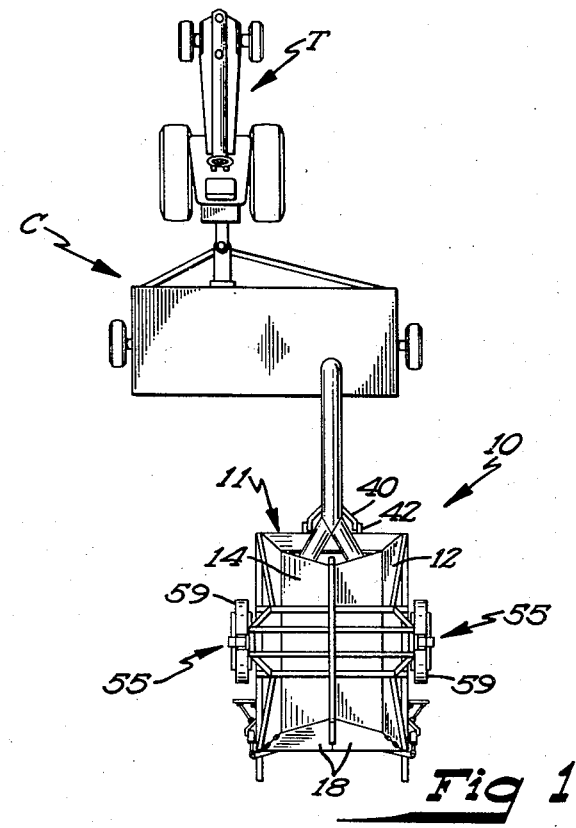
FIG. 1 is a top plan view of the novel haystack forming device which is illustrated as being connected to a chopper machine and a tractor.
Figure 2:
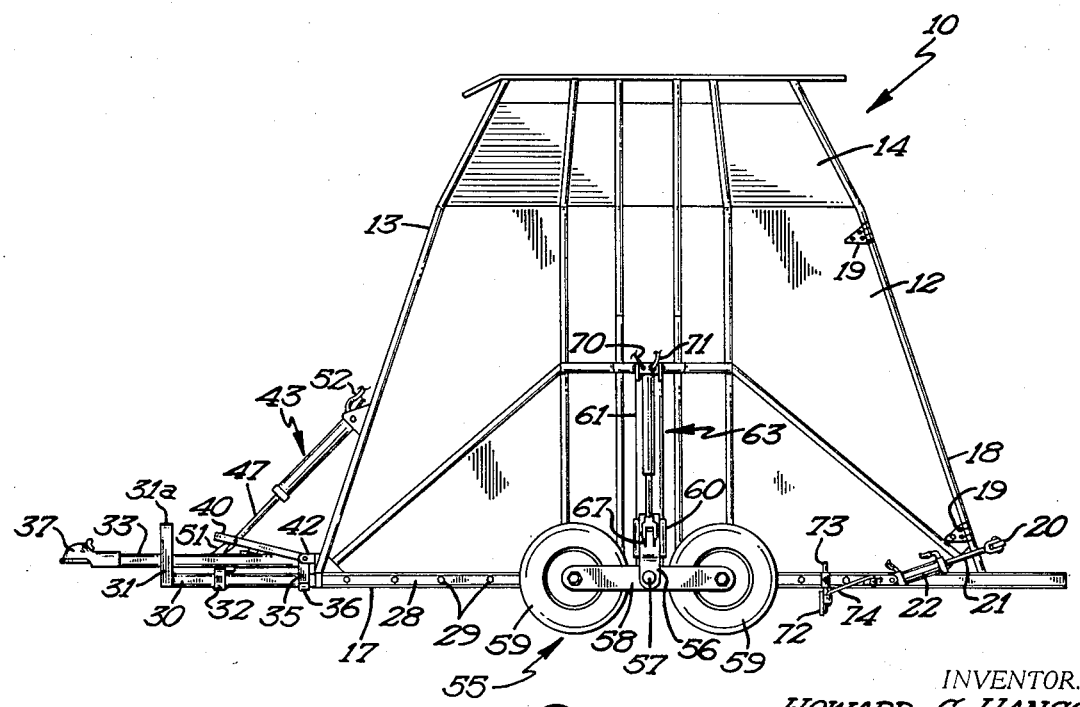
FIG. 2 is a side elevational view of the haystack forming device illustrated in a travel condition.

Referring now to the drawings and more specifically to FIGS. 1 and 2, it will be seen that one embodiment of the novel haystack forming device designated generally by the reference numeral 10, is there shown in towed relation with respect to a tractor T and a hay chopping machine C. The haystack forming device 10 is comprised of a symmetrically shaped housing 11 which includes upstanding side wall 12, a front wall 13, and a roof or top wall 14. It will be noted that the front and side walls are inclined upwardly and inwardly and that vertical frame members 15 are provided which reinforce the side walls, front wall and the roof. The front wall is provided with an inlet opening 16 adjacent the upper end thereof and suitable longitudinal frame members 17 extend longitudinally along the lower edge of the housing 11. Certain of the vertical frame members 15 are rigidly interconnected at their lower ends to the longitudinal frame member 17 and are rigidly interconnected together at their respective upper ends along the upper surface of the roof 14. This arrangement provides a rather lightweight housing but one which is substantially strong.

The rear of the housing which is open is closed by suitable doors or closure members 18 which are pivotally connected to the side walls of the housing by hinges 19. Each door 18 has an arm 20 rigidly affixed thereto adjacent the lower end thereof and this arm projects outwardly and slightly forwardly as best seen in FIG. 6. The outer end portion of each arm 20 is pivotally connected to the outer end of a piston rod 21 of a double acting hydraulic ram 22. Each ram 22 is connected by a supply conduit 23 to a source of hydraulic fluid under pressure and each is connected by a return conduit 23a to a reservoir. It will be seen that when the piston rod 21 is retracted, the associated door 18 will be opened and when the piston rod 21 is extended, the associated door will be closed.

The housing is also provided with a floor structure 24 which as shown is of generally rectangular configuration and which has a pair of elongate channels or tracks 25 affixed to the lower surface thereof adjacent the longitudinal edges thereof. The longitudinal frame members 17 are provided with a plurality of longitudinally spaced apart openings therein each accommodating the axle 27 of a roller 26. Each roller is also journalled on its axle and each axle is threaded and projects through an apertured bracket 28 and is secured thereagainst by a nut 29. These rollers, as best seen in FIG. 5, are positioned within the elongate channels or tracks 25 so that the floor structure is mounted for shifting movement in a fore and aft direction relative to the housing 11. In this regard, the floor structure 24 is longitudinally shiftable in a fore and aft direction between open and closed conditions. When the floor is in the open condition, the entire lower end of the housing is open and when the floor is in the closed condition, the floor structure serves to form a floor for the housing.

Referring now to FIGS. 3 and 4, it will be seen that the floor of the housing has an elongate substantially straight tongue supporting member 30 affixed thereto and projecting forwardly therefrom. As shown, this tongue supporting member is of rectangular cross-sectional configuration and it has an inverted U-shaped member 31 affixed to the outer end thereof and projecting upwardly therefrom. This U-shaped member has its web portion 31a spaced substantially above the upper surface of the supporting member 30. The tongue supporting member also has a locking element 32 affixed thereto intermediate the ends thereof and projecting upwardly beyond the upper surface of the tongue supporting member.

The haystack forming device is provided with a hitch means and to this end, the hitch means includes an elongate tongue 23 which as shown is also of rectangular cross-sectional configuration and which is pivotally and slidably mounted on the tongue supporting member 30. The rear end of the tongue 33 is pivotally connected by pivot pins 34 to a pair of mounting ears 35 which are secured to a slide element 36. It will be noted that the slide element 36 embraces the tongue supporting member 30 and is slidable therealong between the front end of the floor structure 24 and the locking element 32. The pivot connection between the slide element and the tongue 33 also permits vertical pivoting movement of the tongue between unlocked and locked conditions. It will be noted that the web portion 31a of the U-shaped member 31 limits upward pivoting movement of the tongue relative to the tongue supporting member.

The front end portion of the tongue 33 is provided with a hitch element 37 which is adapted to be connected to the chopping machine or to the tractor to which the haystack forming device is connected. It is pointed out that any suitable hitch element may be provided which permits an articulated connection between the haystack forming device and the towing vehicle. A locking element 38 is affixed to the lower surface of the tongue 33 intermediate the ends thereof and projects downwardly therefrom. This locking element 38 is adapted to coact with the locking element 32 to retain the tongue in locked condition with respect to the tongue supporting member and thereby prevent longitudinal forward movement of the tongue relative to the tongue supporting member. The locking element 39 is affixed to the upper surface of the tongue 33 intermediate the ends thereof and projects upwardly from the upper surface thereof. It will be noted that in the embodiment shown, the locking elements 38 and 39 respectively are disposed in fairly close proximal relation with respect to each other.

Thus it will be seen that when the locking element 38 is disposed in engaging relation with the rear surface of the locking element 32 on the tongue supporting member, the tongue supporting member will be unable to move or slide forwardly relative to the tongue supporting member until the tongue is permitted to swing vertically upwardly. Means are provided for releasably holding the tongue in a downwardly locked position and to this end, it will be seen that a U-shaped locking arm 40 has opposite ends thereof pivotally connected by pivot pins 41 to ears 42 which are affixed to suitable frame elements secured to the front wall 13 of the housing. The arm 40 is therefore mounted for vertical swinging movement about a horizontal transverse axis.

The means for shifting the arm comprises a hydraulic ram 43 including a cylinder 44 pivotally mounted by pivot pins 45 to ears 46 which are mounted on frame members secured to the front wall 13. The piston of the hydraulic ram has a piston rod 47 secured thereto and this piston rod projects downwardly and is provided with a sleeve 48 affixed to the outer end thereof. The sleeve has a pin 49 projecting therethrough and this pin 49 is journalled in openings in the U-shaped arm 40. It will be noted that the end of the piston rod 47 is chisel-shaped and is engageable in an upwardly concave retaining element 51 which is secured to the upper surface of the tongue 33 forwardly of the locking element 39.

It will be noted that when the piston rod 47 is extended, it engages in the concave retaining element 51 to hold the tongue 33 in a retracted locked condition with respect to the tongue supporting member 30. However, when the piston rod 47 is retracted, and after vertical upward swinging movement of the tongue 33, the locking element 38 will disengage from the locking element 32 and permit extension or forward longitudinal shifting movement of the tongue supporting member. The forward longitudinal movement of the tongue is limited by engagement of the slide element 36 with the locking element 32 and thereafter, additional forward movement of the tongue also produces forward movement of the tongue supporting member and the floor structure 24. One end of a conduit 52 is connected in communicating relation to the hydraulic cylinder 44 and the other end is connected to a diaphragm accumulator. It is pointed out that the piston rod 47 is extended by action of the hydraulic fluid which shifts the piston forwardly or downwardly and the piston rod is retracted by a spring which urges the piston upwardly when hydraulic pressure is relieved.

Means are also provided for releasably interlocking the tongue 33 with the tongue supporting member 30 to prevent slight sliding or creeping movement of the tongue forwardly when the tongue pivots about the pivotal axis 34. In this regard, the ears and slide element 36 have inwardly projecting ball detent units 30a mounted in opposite sides thereof and the spring-urged ball detents of these units engages in a pair of recesses 30b formed in the rear side surfaces of the tongue supporting member 30 when the tongue is in the retracted position as illustrated in FIG. 3. This arrangement permits the tongue 33 to pivot upwardly when the entire device is lowered to the surface of the ground without allowing the tongue to creep forwardly with respect to the tongue supporting member. If the tongue does move slightly forward, it has been found that certain of the coacting locking elements may become disaligned. However, when a forward draft force is exerted on the tongue, the ball detent units will release from the tongue supporting member and allow the tongue to be pulled forwardly. When the tongue is urged rearwardly, the ball detent units snap into the recesses in the tongue supporting member to releasably lock the members together and prevent the forward creep.

Wheel assemblies 55 are provided to support the device for travel over the surface of the ground. These wheel assemblies 55 are also vertically translatable between a lowered transport position as illustrated in FIG. 2, and an elevated retracted position wherein the lower surface of the frame elements of the housing are positioned upon the surface of the ground. Each wheel assembly includes an inverted U-shaped yoke 56 which is pivotally connected at its lower end by a pivot 57 to a pair of wheel mounting members or straps 58 which serve to mount the ground engaging wheels 59. The inner leg of the U-shaped yoke is provided with a slide member 60 which embraces a vertical slide engaging member 61. It will be seen that opposite ends of the slide engaging member are secured to brackets or plates 62 which in turn are rigidly affixed to vertical frame members 15 of the housing 11.

Means are provided for vertically translating the wheel assembly and to this end, each wheel assembly is provided with a hydraulic ram 63 which is comprised of a cylinder 64 having a piston therein to which is connected a piston rod 65. The lower end of each piston rod is pivotally connected by a pivot 66 to ears 67 secured to the web portion of the associated U-shaped yoke 56. The upper end of the hydraulic cylinder is pivotally connected by a pivot 68 to ears 69 which are secured to the slide engaging member 61. It will be seen that when the piston rod 65 is extended, the wheels will be urged downwardly to the transport position. Conversely, when the piston rod 65 is retracted, each wheel assembly will be vertically shifted upwardly to the retracted raised position so that the housing is positioned above the surface of the ground. Each hydraulic ram cylinder 64 has one end of a supply conduit 70 and one end of a return conduit 71 connected thereto in communicating relation therewith.

The housing 11 is provided with a pair of ground anchors 72 (only one of which is shown in detail in the drawings), each being secured to one side of the housing adjacent the rear end thereof. Each ground anchor 72 is rigidly secured to a vertical standard 73 which in turn is received within a vertical sleeve 73a which is secured to longitudinal frame member 17. The standard is adjustable in the sleeve by means of a set screw 73b. Each ground anchor is also connected to one end of a transverse brace 74. It will be seen that one end of the brace 74 is bent downwardly and is received in a sleeve 74a secured to the ground anchor 72. The other end of the brace 74 is received in a sleeve 74b secured to the associated longitudinal frame member of the housing. Suitable set screws permit the brace to be vertically adjusted relative to the frame and ground anchor. These ground anchors 72 are adapted to penetrate the surface of the ground when the ground engaging wheel assemblies 55 are retracted and serve to prevent forward movement of the housing relative to the ground.

Figure 8:
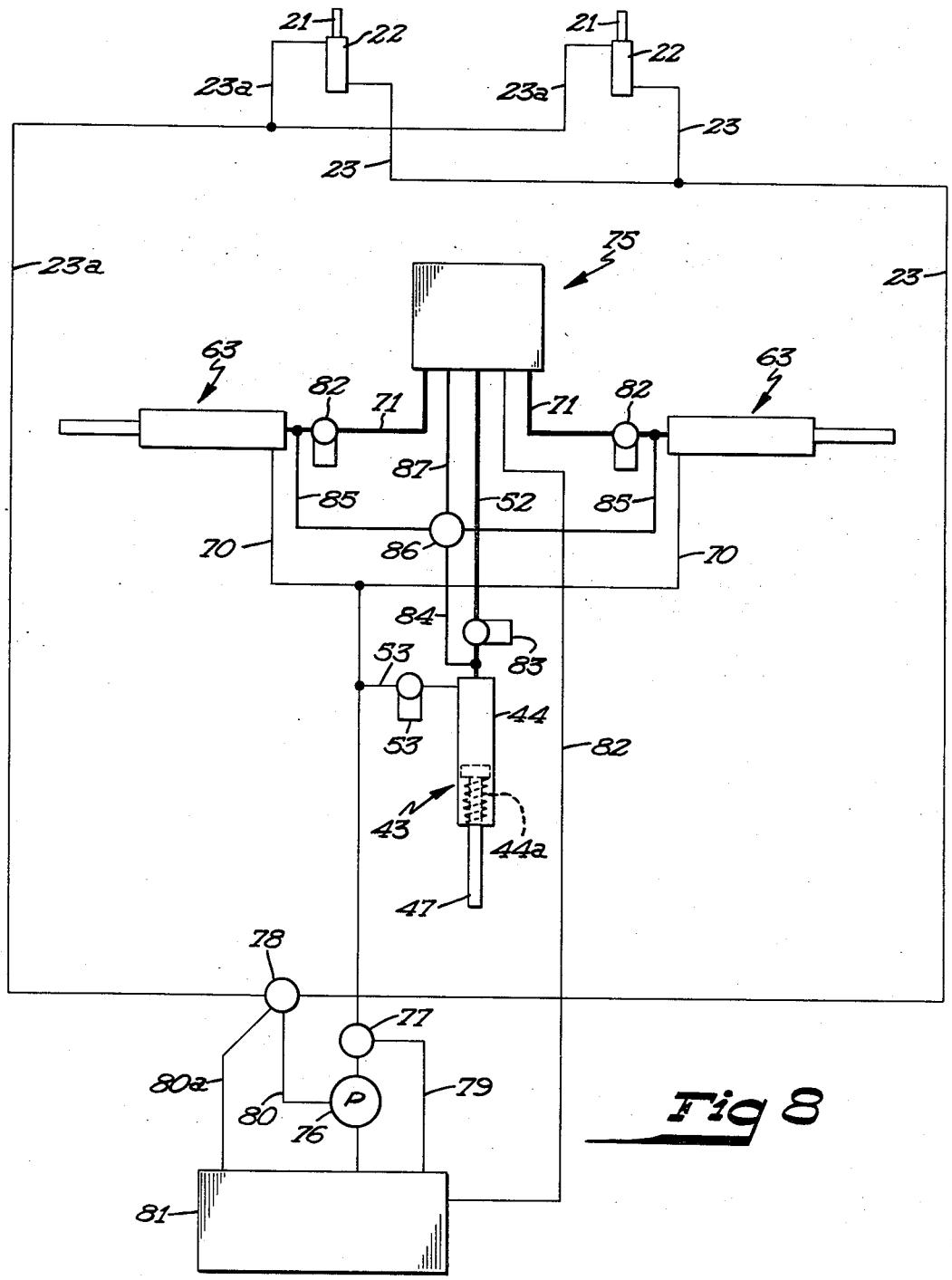
FIG. 8 is a diagrammatic view of the hydraulic system used in the operation of the various components.

Referring now to FIG. 8, the flow diagram of the various hydraulic units is there shown. It will be seen that the conduits 52 for the hydraulic ram 43 is connected in communicating relation to a diaphragm accumulator. Similarly, the return conduit 71 for the hydraulic rams 63 of the wheel assemblies 55 are also connected in communicating relation with the accumulator 75. The supply conduits 70 for the hydraulic ram 63 are connected to a main supply conduit 70a which in turn is connected in communicating relation to a pump 76. The conduit 70a is also connected to a reservoir 81 which, along with the pump 76, is mounted on the tractor or prime mover which tows the chopping machine and hay forming device 10.

A selector valve 77 is interposed in flow controlling relation with respect to the conduit 70a. Similarly, a selector valve 78 is connected in flow controlling relation with the supply conduits 23 for the hydraulic ram cylinders 22 which operate the closure member or doors 18. The return conduits 23a for the cylinders 22 are connected in communicating relation with respect to the reservoir 81. It will be noted that a bypass conduit 80 interconnects the selector valve 78 with the pump 76 and that a bypass line 79 interconnects the reservoir 81 with the selector valve 77. This permits fluid under pressure to be circulated between the selector valves and the conduit 31 without requiring the conduit in which the selector valves are interposed to be charged. One end of a return conduit 82 is connected in communicating relation with the accumulator 75 and is connected at its other end to the reservoir 81. This permits the hydraulic liquid to be circulated from the accumulator to the reservoir 81.

It will be noted that a pair of solenoid valves 82 are interposed in flow controlling relation with respect to the conduits 71 and these valves are of the normally closed type. Therefore when the valves are energized, the valve element is shifted to the open position, thus intercommunicating the hydraulic ram with the accumulator 75. This allows the fluid to flow from the hydraulic rams 63 into the accumulator 75. Similarly, the conduit 52 for the hydraulic ram 43 also has a solenoid valve 83 interposed in flow controlling relation therewith. This solenoid valve is also of the normally closed type whereby when the solenoid valve is energized, the valve will be shifted to the open condition, thereby letting fluid flow from the ram 43 into the accumulator 75. Suitable electrical switches are provided and mounted on the tractor for operating the solenoid valves.

It will also be seen that one end of a conduit 84 is connected in communicating relation to the hydraulic ram 43 and the other end thereof is connected to a manually operable valve 86. The valve 86 is also connected in communicating relation to the respective ends of a pair of conduits 85, each conduit also being connected to the return port of one of the hydraulic rams 63. The manual valve 86 is also connected by a conduit 87 to the accumulator 75. Thus by manually opening the valve 86, fluid will be allowed to return to the accumulator 75 from the rams 63 and from the ram 43.

Means are also provided for preventing downward bowing of the forward portion of the floor structure relative to the housing of the device especially when the machine is loaded from the rear. It has been found that when the machine is overloaded, the central forward portion of the floor structure tends to deflect downwardly in response to the excessive weight. To compensate for this tendency of the floor structure to deflect downwardly, reference is made to FIG. 3 wherein it will be seen that a pair of vertical straps or bars 90 are provided each being fixedly connected to the front edge of the floor structure as by welding and each projecting upwardly therefrom. It will be noted that these straps or bars 90 which are formed of suitable rigid metallic material are positioned on opposite sides of the tongue and each has its upper end bent rearwardly to form hook portions 91. These hook portions for the straps overlie the lowermost of the transverse frame elements 13a when the floor is in a retracted position. With this arrangement, the tendency of the central portion of the floor structure towards downward deflection would be restrained by engagement of the straps 90 with the transverse frame elements 13a.

During operation of the device, the hitch element 37 will be connected in articulated relation to a hitch on the chopping machine so that the haystack forming device will be towed behind the chopping machine as the hay is chopped and discharged into the device. When the haystack forming device is being towed, the piston rod 47 of the hydraulic ram 43 will be extended and will engage in the concave retaining element 51. The locking element 38 will engage the locking element 32 and the locking element 39 will be engaged by the locking element 40a which is mounted on the U-shaped locking arm 40. With this arrangement, the tongue 33 is releasably interlocked to the tongue supporting member 30 and also releasably interlocked to the housing 11 by means of the locking arm 40. Therefore when a forward draft is exerted on the haystack forming device, the device will be pulled in a forwardly direction.

The wheel assemblies will be in the downward extended position for supporting the housing above the surface of the ground and the rear doors 18 will be closed. When the device is filled with a predetermined amount of the chopped hay, the chopped hay will tend to pack and thus form a dimensionally stable haystack. A switch on the tractor will be activated to energize the solenoid valves 82 and to also energize the solenoid valve 83. The piston rods 65 for the rams 63 will be retracted and cause retracting and raising of the wheel assemblies 55 thereby permitting the housing to be positioned upon the surface of the ground. The circuitry for the solenoid valves 82 and 83 is such that there is a time delay in the opening of the valve 83 so that the piston rod 47 is retracted shortly after the wheel assemblies 55 begin to retract. It will be seen that the hydraulic fluid flows from the cylinders of the ram 63 through the return conduits 71 into the accumulator 75. Fluid will also flow from the cylinder of the hydraulic ram 43 through the conduit 52 into the accumulator 75. When pressure is relieved in the ram 43, the spring 44a in the ram will retract the piston rod 47 thereby disengaging the piston rod from the concave retaining element 51. This permits the locking arm 40 to pivot upwardly thereby permitting disengagement of the locking element 40a with respect to the locking element 39 on the tongue 33. Since the pivot point for the tongue 33 has moved downwardly because of the downward movement of the housing, the tongue 33 will pivot upwardly thereby disengaging the locking element 38 from engaging relation with respect to the locking element 32 on the tongue supporting member 30. The hydraulic rams 22 may also have their respective piston rods retracted, thus opening the closure members or doors 18.

Thereafter, if the tractor or towing vehicle is pulled forwardly, the tongue 33 will be shifted forwardly relative to the tongue supporting member until the slide element strikes the locking element 32 on the tongue supporting member. This produces a jarring effect and causes the stack to become disengaged from the upstanding walls of the housing. Thereafter, if the towing vehicle is moved further forwardly, the tongue and tongue supporting member along with the floor structure so that the latter will be moved forwardly from the closed position to the open position thereby causing the haystack to be deposited directly upon the ground. The switch on the tractor may then be actuated to close the solenoid valves 82 with the ram 63 and the valve on the tractor may be shifted to cause the hydraulic liquid to flow through the conduit 70a into the supply conduit 70 to extend the piston rods from the rams 63. Thus the wheel assemblies will then be shifted downwardly to elevate the housing above the surface of the ground and to cause disengagement of the ground anchors from embedded relation with respect to the ground. The doors 18 will remain in an open position and further forward movement permits the housing to be moved away from the haystack.

The tractor or towing vehicle may then be driven in a reverse direction to shift the tongue 33 rearwardly to the retracted position from the extended position so that the locking element 38 is positioned rearwardly of the locking element 32. Fluid is supplied to the ram 43 through a supply conduit 53 which is connected in communicating relation to the ram and which is also connected in communicating relation to the supply conduit 70a. However, it will be noted that a solenoid valve 53a is interposed in flow controlling relation with respect to the conduit 53 and this valve is opened to permit fluid to be supplied to the ram 43. It will be seen that when the piston rod 47 is extended, the end 50 of the piston rod will engage in the concave retaining element 51 and the locking element 39 will be engaged by the locking element 40a on the locking element 40. The tongue 33 will again be interlocked to floor structure and to the housing. The rear doors may be closed by operating the selector valve 78 through a control on the tractor so that fluid under pressure is supplied through the conduit 23 to extend the piston rod 21. It will be noted that the selector valve 78 is interconnected to the pump by the bypass line 80 and is interconnected to the reservoir by the conduit 80a.

When it is desirable to prepare the haystack device for an extended period of disuse, it is desirable to retract the rams 63 and this operation may be performed manually. This can be accomplished by opening the manual valve 86 which intercommunicates the ram 63 with the accumulator and also intercommunicates the ram 43 with the accumulator. Thus the housing may be allowed to shift slowly downwardly to be positioned upon the surface of the ground. It will be appreciated that the wheel assemblies may be extended in the normal manner when it is again desirable to use the haystack forming device.

From the foregoing, it will be seen that the haystack forming device permits the formation of a dimensionally stable haystack formed of chopped hay and which may be very nicely deposited upon the surface of the ground but requiring only the tractor operator to accomplish this process. By vertically translating the wheel assemblies, the housing may be very nicely and efficiently positioned directly upon the surface of the ground prior to shifting the floor structure to open position. Further, the improved means of interlocking the tongue with the tongue supporting member and the housing in releasably locked condition permits disengagement and interengagement of these various elements in a positive but simple manner.

Thus it will be seen that I have provided a novel haystack forming device which is more efficient than any heretofore known comparable device.

What is claimed is:

1. A tow type haystack forming device comprising a housing including upstanding walls, said housing having an open rear end and an open lower end, closure structure on said housing for closing said open rear end, means for shifting said closure structure between opened and closed positions, a pair of ground engaging wheel assemblies each being positioned on opposite sides of said housing and being interconnected thereto for vertical translation between elevated retracted and lowered extended positions, said wheel assemblies when in the lowered position supporting the housing above the surface of the ground for travel thereover, and when in the elevated position positioning the housing upon the surface of the ground;

hydraulic ram means connected with said ground engaging wheel assemblies for causing vertical translation thereof between lowered and elevated positions, a floor structure slidably mounted on said housing for fore and aft movement relative thereto between opened and closed positions, said floor structure when in the closed position closing the opened lower end of the housing and being slidable forward to the opened position to completely open the entire lower end of said housing, a hitch mechanism including an elongate tongue pivotally connected at one end thereof with the floor structure for vertical pivotal movement relative thereto about a transverse horizontal axis between locked and unlocked conditions, said elongate tongue being connected with said floor structure for longitudinal shifting movement relative thereto in a fore and aft direction between extended and retracted positions, said tongue when pivoted to the unlocked condition, being shiftable forwardly to an extended position, and upon further forward movement causing the floor structure to be longitudinally shifted forwardly therewith to an opened condition, a locking mechanism on said housing shiftable between released and locking positions, and when in the locking position engaging said tongue to hold the same in a locked condition with respect to the floor structure whereby the latter is retained in a closed condition.

2. The haystack forming device as defined in claim 1 wherein said hitch mechanism includes an elongate tongue supporting member rigidly affixed to said floor structure and projecting forwardly therefrom, means on the rear end of said tongue slidably and pivotally connected with said tongue supporting member to permit fore and aft longitudinal shifting movement of the tongue between the extended and retracted positions, coacting locking elements on said tongue and tongue supporting member for locking the tongue against longitudinal movement relative to the tongue supporting member, and coacting means on said tongue and tongue supporting member limiting forward sliding movement of the tongue relative to said tongue supporting member.

3. The haystack forming device as defined in claim 1 wherein said locking mechanism comprises a locking arm shiftably mounted on said housing and having a locking element thereon engaging a locking element on the tongue, hydraulic ram means for power shifting said locking arm between released and locked positions.

4. The haystack forming device as defined in claim 2 wherein said locking mechanism includes a locking arm pivotally mounted on said housing, a second lock engaging element on said tongue, a locking element on said locking arm coacting with the second locking element on the tongue for releasably locking the tongue with the tongue supporting member, and power shifting means for shifting the locking arm between release and locked positions.

5. The haystack forming device as defined in claim 1 and a hitch element on the forward end of said tongue for connection with a towing vehicle.

6. The haystack forming device as defined in claim 1 wherein said closure structure comprises a pair of doors each being hingedly connected with said upstanding walls for swinging movement between closed and opened positions, and said means for shifting said doors between said opened and closed conditions comprises a pair of hydraulic rams connected with the doors and with said housing.

* * * * *